United States Patent
Aoki

(10) Patent No.: US 8,570,494 B2
(45) Date of Patent: Oct. 29, 2013

(54) ELECTRO-OPTICAL DISTANCE METER

(75) Inventor: Yasutoshi Aoki, Tokyo (JP)

(73) Assignee: Sokkia Topcon Co., Ltd., Tokyo (JP)

( * ) Notice: Subject to any disclaimer, the term of this patent is extended or adjusted under 35 U.S.C. 154(b) by 139 days.

(21) Appl. No.: 13/258,744

(22) PCT Filed: Mar. 17, 2010

(86) PCT No.: PCT/JP2010/054586
§ 371 (c)(1),
(2), (4) Date: Sep. 22, 2011

(87) PCT Pub. No.: WO2010/146906
PCT Pub. Date: Dec. 23, 2010

(65) Prior Publication Data
US 2012/0013888 A1  Jan. 19, 2012

(30) Foreign Application Priority Data

Jun. 17, 2009 (JP) .................... 2009-144488

(51) Int. Cl.
*G01C 3/08* (2006.01)
(52) U.S. Cl.
USPC ......... 356/5.09; 356/3.01; 356/3.1; 356/5.01; 356/5.1
(58) Field of Classification Search
USPC ............. 356/3.01–3.15, 4.01–4.1, 5.01–5.15, 356/6–22, 28, 28.5
See application file for complete search history.

(56) References Cited

U.S. PATENT DOCUMENTS

| 4,531,833 A | 7/1985 | Ohtomo |
| 2001/0013929 A1* | 8/2001 | Torsten ........................ 356/5.01 |

FOREIGN PATENT DOCUMENTS

| JP | 58-38880 A | 3/1983 |
| JP | 6-66516 A | 3/1994 |
| JP | 2001-255369 A | 9/2001 |
| JP | 2005-221330 A | 8/2005 |

* cited by examiner

*Primary Examiner* — Luke Ratcliffe
(74) *Attorney, Agent, or Firm* — Roberts Mlotkowski Safran & Cole P.C.

(57) ABSTRACT

[Problem] To provide an electro-optical distance meter in which the measurement time is reduced, and a temperature phase drift of electrical components is reduced.

[Solution Means] An electro-optical distance meter includes a first light-emitting element (13) which emits light modulated with a plurality of main modulation frequencies ($F_1$ and $F_2$), a second light-emitting element (14) which emits light modulated with a plurality of adjacent modulation frequencies ($F_1 - \Delta f_1$ and $F_2 - \Delta f_2$) close to the main modulation frequencies, respectively, first and second light receiving elements (40 and 48) which receive light emitted from both light-emitting elements, a first frequency converter group (42, 44) connected to the first light receiving element, and a second frequency converter group (50, 52) connected to the second light receiving element. The light emitted from the first light-emitting element is split into two parts, one of these is made incident onto the first light receiving element through a distance measuring optical path (23) for traveling to and from a target reflection object (22), and the other is made incident onto the second light receiving element through a first reference optical path (26), and the light emitted from the second light-emitting element is split into two parts, one of these is made incident onto the second light receiving element through a second reference optical path (31), and the other is made incident onto the first light receiving element through a third reference optical path (29).

2 Claims, 7 Drawing Sheets

Fig.3

Frequency Examples

| | $a > 0 > b$ | $a > b > 0$ | $b > 0 > a$ | $0 > b > a$ |
|---|---|---|---|---|
| Modulation frequency of light-emitting element 13 | $F_1$<br>$F_2$ | $F_1$<br>$F_2$ | $F_1$<br>$F_2$ | $F_1$<br>$F_2$ |
| Modulation frequency of light-emitting element 14 | $F_1 - \Delta f_1$<br>$F_2 - \Delta f_2$ | $F_1 + \frac{\Delta f_1}{2}$<br>$F_2 + \frac{\Delta f_2}{2}$ | $F_1 + \Delta f_1$<br>$F_2 + \Delta f_2$ | $F_1 - \frac{\Delta f_1}{2}$<br>$F_2 - \frac{\Delta f_2}{2}$ |
| Local oscillation frequency | $F_1 + \Delta f_1$<br>$F_2 + \Delta f_2$ | $F_1 + \Delta f_1$<br>$F_2 + \Delta f_2$ | $F_1 - \Delta f_1$<br>$F_2 - \Delta f_2$ | $F_1 - \Delta f_1$<br>$F_2 - \Delta f_2$ |
| Intermediate frequency | $\Delta f_1$<br>$2\Delta f_2$<br>$\Delta f_2$<br>$2\Delta f_2$ | $\Delta f_1$<br>$\frac{\Delta f_1}{2}$<br>$\Delta f_2$<br>$\frac{\Delta f_2}{2}$ | $\Delta f_1$<br>$2\Delta f_1$<br>$\Delta f_2$<br>$2\Delta f_2$ | $\Delta f_1$<br>$\frac{\Delta f_1}{2}$<br>$\Delta f_2$<br>$\frac{\Delta f_2}{2}$ |

ELECTRO-OPTICAL DISTANCE METER

TECHNICAL FIELD

The present invention relates to an electro-optical distance meter, and more particularly, to an electro-optical distance meter from which a shutter for switching light emitted from a light-emitting element into a distance measuring optical path (external optical path) and into a reference optical path (internal optical path) is omitted.

BACKGROUND ART

In a conventional electro-optical distance meter, errors unique to the electro-optical distance meter have been corrected by measuring the distance by alternately switching, by moving a shutter, light emitted from a light-emitting element into a distance measuring optical path for traveling to and from a target reflection object (a target, reflective sheet, or non-prism object) and into a reference optical path directly heading for a light receiving element from a light source. However, because a shutter movement is involved, there have been drawbacks that not only does the distance measurement take time, but also the motion is slowed down at low temperature. Therefore, an electro-optical distance meter without using a shutter for switching into a distance measuring optical path and a reference optical path has been desired.

As such an electro-optical distance meter without using a shutter, one as disclosed in the following patent literature 1 is known. In FIG. 9, a block diagram of this electro-optical distance meter is shown.

This electro-optical distance meter includes two light-emitting elements 1P and 2P. A light 30P emitted from the light-emitting element 1P is split into two parts by a beam splitter 3P, one of these is as a distance measuring light 32P made incident onto a light receiving element 5P through a distance measuring optical path for traveling to and from a target reflection object 60P, and the other is as a reference light 33P made incident onto a light receiving element 4P through a reference optical path that is inside the electro-optical distance meter. A light 31P emitted from the light-emitting element 2P serves as a reference light, and is split into two parts by a beam splitter 6P, one of these is made incident onto the light receiving element 4P, and the other 35P is made incident onto the light receiving element 5P. In addition, a diffuser 51P for diffusing light is disposed at a nearer side of the light receiving element 4P, and a scatter 11P for scattering light is disposed at a nearer side of the light receiving element 5P.

The light-emitting element 1P is connected to a synthesizer 21P via an amplifier 23P, and emits light modulated with a frequency $f_1$. The light-emitting element 2P is connected to a synthesizer 22P via an amplifier 24P, and emits light modulated with a frequency $f_2$. Both synthesizers 21P and 22P are connected to a common oscillator 20P.

The light receiving element 4P is connected to a frequency converter 7P via an amplifier 9P, and the light receiving element 5P is connected to a frequency converter 8P via an amplifier 10P. Both frequency converters 7P and 8P are supplied with a local oscillation signal of a frequency $f_{LO}$ from a local oscillator 12P. Both frequency converters 7P and 8P are for conversion to intermediate frequency signals $f_{ZF1}$ and $f_{ZF2}$ of frequencies equal to differences between output signals from the light receiving elements 4P and 5P and the local oscillation signal, respectively.

A filter 13P connected to the frequency converter 7P is structured so as to pass only a frequency $f_{zf1}$ that is a difference between the frequencies $f_1$ and $f_{LO}$, and selects only an intermediate frequency signal according to the reference light 33P modulated with the frequency $f_1$, that is, an intermediate frequency signal according to a reference distance $D_1$. A filter 14P connected to the frequency converter 8P is structured so as to pass only a frequency $f_{zf2}$ that is a difference between the frequencies $f_2$ and $f_{LO}$, and selects only an intermediate frequency signal according to the reference light 35P modulated with the frequency $f_2$, that is, an intermediate frequency signal according to a reference distance $D_2+D_3$.

Next, the light-emitting elements 1P and 2P are changed in their respective modulation frequencies of emitting lights so as to emit light modulated with the frequency $f_2$ from the light-emitting element 1P and emit light modulated with the frequency $f_1$ from the light-emitting element 2P. Then, the filter 13P connected to the frequency modulator 7P, which is structured so as to pass only the frequency $f_{zf1}$ that is a difference between the frequencies $f_1$ and $f_{LO}$, thus selects only an intermediate frequency signal according to the reference light 34P modulated with the frequency $f_1$, that is, an intermediate frequency signal according to a reference distance $D_2$. The filter 14P connected to the frequency converter 8P is structured so as to pass only the frequency $f_{zf2}$ that is a difference between the frequencies $f_2$ and $f_{LO}$, and selects only an intermediate frequency signal according to the distance measuring light 32P modulated with the frequency $f_2$, that is, an intermediate frequency signal according to a measuring distance $D_0$.

Thus, by alternatively changing the modulation frequencies $f_1$ and $f_2$ of light to be emitted from both light-emitting elements 1P and 2P, a total of four intermediate frequency signals of the intermediate frequency signal according to the measuring distance $D_0$ and the respective intermediate frequency signals according to the reference distances $D_1$, $D_2$, and $D_2+D_3$ are obtained.

The filter 13P is connected to an A/D converter 17P via an amplifier 15P. The filter 14P is connected to an A/D converter 18P via an amplifier 16P. Both A/D converter 17P and 18P are connected to a digital Fourier transformer 19P. With this, by determining initial phases of the four intermediate frequency signals, an error content unique to the electro-optical distance meter can be corrected to determine a precise distance to a measurement target 60P.

CITATION LIST

Patent Literature

Patent Literature 1: Japanese Published Unexamined Patent Application No. 2001-255369

SUMMARY OF INVENTION

Technical Problem

In the electro-optical distance meter disclosed in the above patent literature 1, because it is necessary to alternately switch the modulation frequencies $f_1$ and $f_2$ of lights to be emitted from both light-emitting elements 1P and 2P, the four intermediate frequency signals cannot be obtained at one time, the distance measurement still takes time, and further, because of a difference in time at which the respective intermediate frequency signals were obtained, an error is produced also by a temperature phase drift due to electrical components such as the light-emitting elements 1P and 2P and the light receiving elements 4P and 5P.

The present invention has been made in view of the above problems, and an object thereof is to provide an electro-optical distance meter in which the time required for a distance measurement is reduced, and a temperature phase drift of electrical components is reduced.

Solution to Problem

In order to achieve the above object, an electro-optical distance meter according to a first aspect of the present invention includes a first light-emitting element which emits light modulated with a plurality of main modulation frequencies (for example, $F_1$ and $F_2$), a second light-emitting element which emits light modulated with a plurality of adjacent modulation frequencies (for example, $F_1-\Delta f_1$ and $F_2-\Delta f_2$) close to the main modulation frequencies, respectively, a first light receiving element and a second light receiving element which receive light emitted from both light-emitting elements, a first frequency converter group connected to the first light receiving element, and a second frequency converter group connected to the second light receiving element, in which the light emitted from the first light-emitting element is split into two parts, one of these is as a distance measuring light made incident onto the first light receiving element through a distance measuring optical path for traveling to and from a target reflection object, and the other is as a reference light made incident onto the second light receiving element through a first reference optical path, and the light emitted from the second light-emitting element is split into two parts, one of these is as a reference light made incident onto the second light receiving element through a second reference optical path, and the other is as a reference light made incident onto the first light receiving element through a third reference optical path, the first frequency converter group and the second frequency converter group are each composed of frequency converters which are the same in number as the main modulation frequencies, the respective frequency converters are input with local oscillation signals of frequencies different from each other, and the frequencies of said local oscillation signals are provided, respectively, as frequencies (for example, $F_1+\Delta f_1$ and $F_2+\Delta f_2$,) close to both of the respective main modulation frequencies and the respective adjacent modulation frequencies close to the respective main modulation frequencies, and a distance to the target reference object is calculated by using intermediate frequency signals generated in the respective frequency converters.

A second aspect of the present invention provides the electro-optical distance meter according to the first aspect of the present invention, in which the respective intermediate frequency signals have frequencies which are integral multiples of the lowest frequency, and the respective intermediate frequency signals are separated by a digital band-pass filter.

Advantageous Effects of Invention

By the electro-optical distance meter according to the first aspect of the present invention, because the initial phases of the respective intermediate frequency signals according to the distance measuring optical path and reference light paths are simultaneously determined without using a shutter for switching between the distance measuring light and reference light and also without switching modulation frequencies, a distance measurement can be performed more speedily than conventionally performed. Moreover, a cost reduction by omitting a shutter is enabled. Further, according to the present invention, because a simultaneous measurement of the measuring distance and reference distances is enabled, the temperature phase drift cancels out, and the temperature phase drift of electrical components can be reduced. Therefore, conventionally, light-emitting elements under a continuous distance measurement had been kept powered on in order to reduce the temperature phase drift of the electrical components, but the power of the light-emitting elements can be turned on and off at each measurement in the present invention, so that power saving can be realized.

By the second aspect of the present invention, further, the respective intermediate frequency signals have frequencies which are integral multiples of the lowest frequency, and the respective intermediate frequency signals are separated by a digital band-pass filter, and thus the four frequencies can be separated reliably to improve measurement accuracy.

BRIEF DESCRIPTION OF DRAWINGS

FIG. 3 is a table showing examples of the main modulation frequency, adjacent modulation frequency, local oscillation frequency, and intermediate frequency of the above-described electro-optical distance meter.

DESCRIPTION OF EMBODIMENTS

Figure 1:
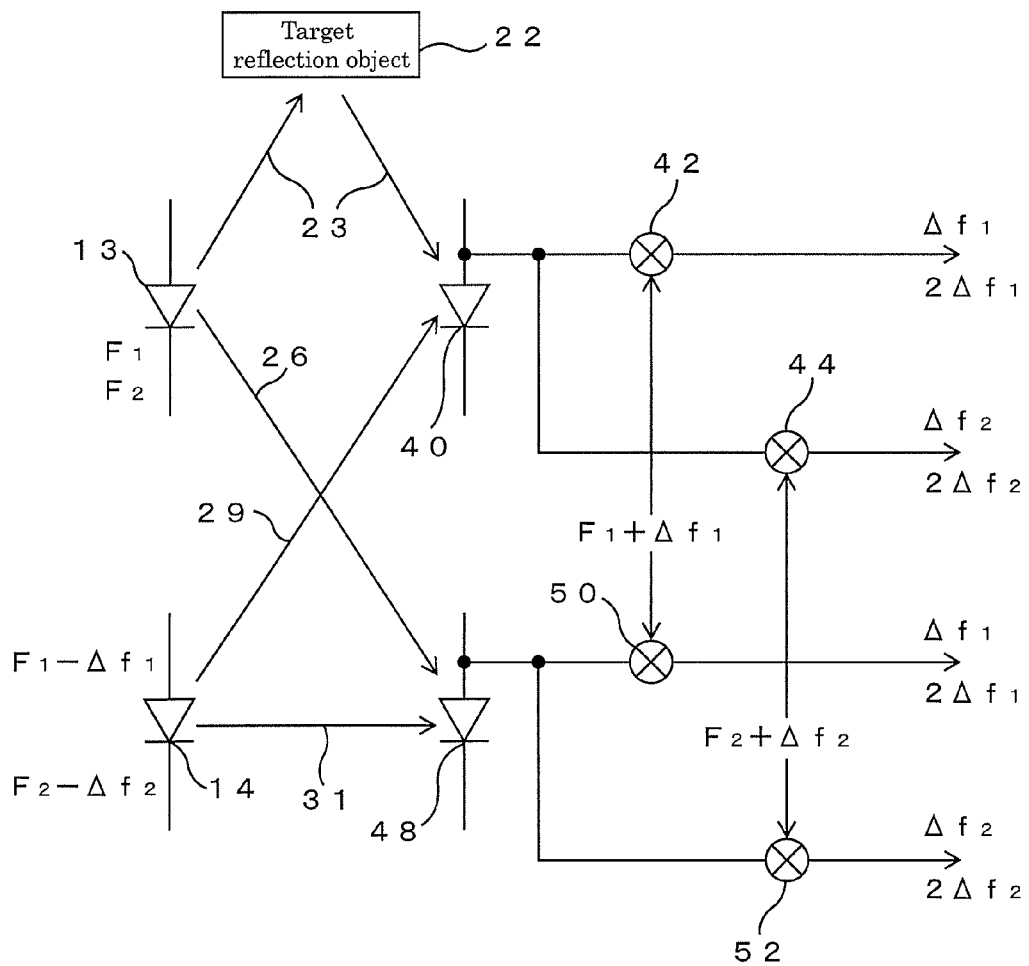
FIG. 1 is a block diagram showing the main part of an electro-optical distance meter according to an embodiment of the present invention.
Figure 2:
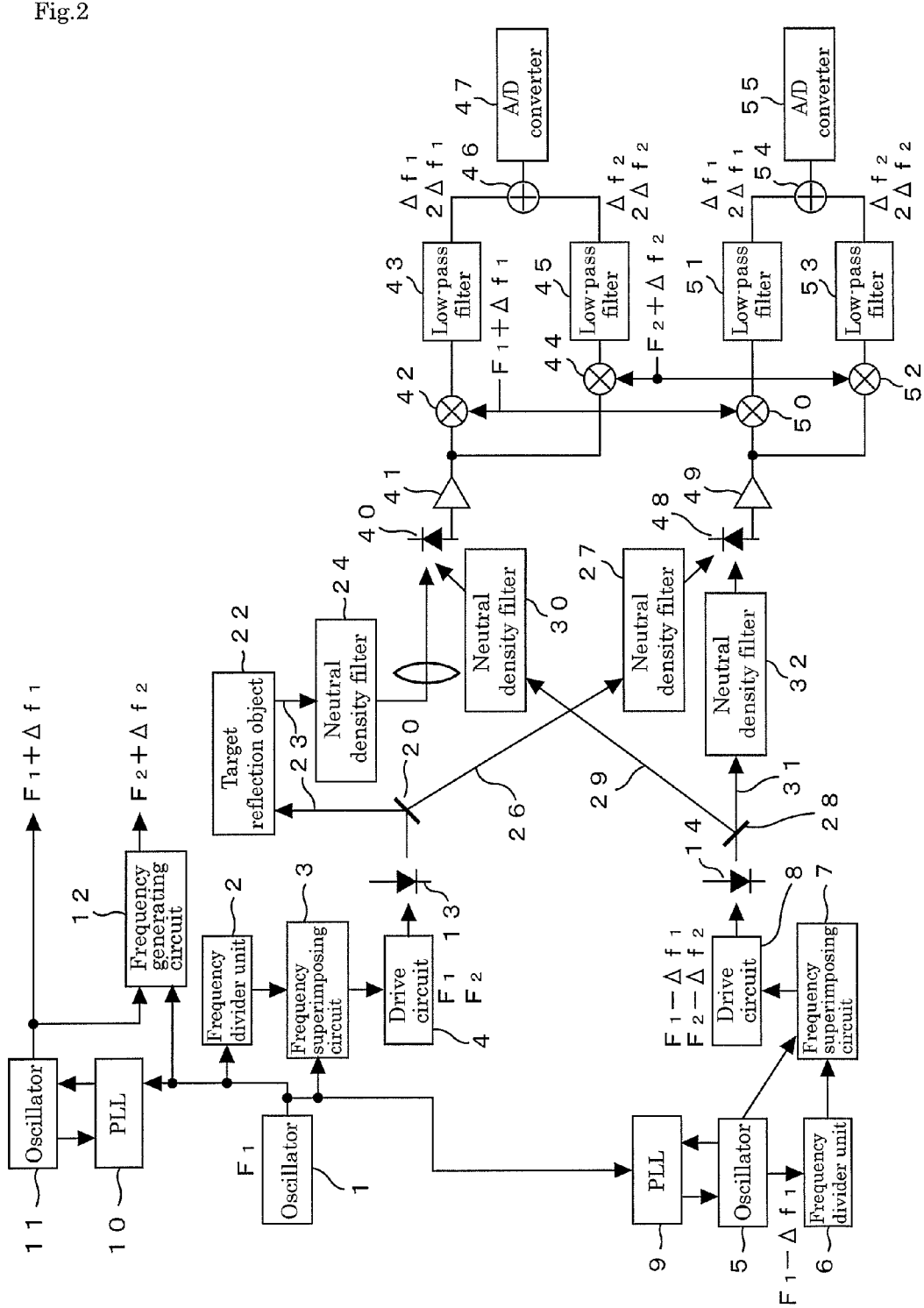
FIG. 2 is a detailed block diagram of the above-described electro-optical distance meter.

Hereinafter, an embodiment of an electro-optical distance meter of the present invention will be described in detail based on FIG. 1 to FIG. 3.

First, the main part of this electro-optical distance meter will be described based on FIG. 1. This electro-optical distance meter includes two light-emitting elements 13 and 14 such as laser diodes, emits light modulated with frequencies $F_1$ and $F_2$ (hereinafter, referred to as main modulation frequencies) from the first light-emitting element 13, and emits from the second light-emitting element 14 light modulated with frequencies $F_1-\Delta f_1$ and $F_2-\Delta f_2$ (hereinafter, referred to as adjacent modulation frequencies) close to the main modulation frequencies $F_1$ and $F_2$, respectively. The light emitted from the first light-emitting element 13 is split into two parts, one of these is as a distance measuring light made incident onto a first light receiving element 40 through a distance measuring optical path 23 for traveling to and from a target reflection object 22, and the other is as a reference light made incident onto a second light receiving element 48 through a first reference optical path 26. The light emitted from the second light-emitting element 14 is split into two parts, one of these is as a reference light made incident onto the second light receiving element 48 through a second reference optical path 31, and the other is as a reference light made incident onto the first light receiving element 40 through a third reference optical path 29.

The first light receiving element 40 is connected to a first frequency conversion group 42, 44, and the second light receiving element 48 is connected to a second frequency conversion group 50, 52. That is, the output of the first light receiving element 40 is split into two parts of the same number as the number of main modulation frequencies $F_1$ and $F_2$, one of these is input to the first frequency converter 42, and the other is input to the second frequency converter 44. The output of the second light receiving element 48 is also split into two parts of the same number as the number of main modulation frequencies $F_1$ and $F_2$, one of these is input to the third frequency converter 50, and the other is input to the fourth frequency converter 52.

The first frequency converter 42 generates an intermediate frequency signal of a frequency $\Delta f_1$ by multiplying a signal obtained from the distance measuring light modulated with the main modulation frequency $F_1$ and passed through the distance measuring optical path 23 by a local oscillation signal of a frequency $F_1+\Delta f_1$ close to each of the foregoing main modulation frequency $F_1$ and adjacent modulation frequency $F_1-\Delta f_1$. Moreover, the first frequency converter 42 generates an intermediate frequency signal of a frequency $2\Delta f_1$ by multiplying a signal obtained from the reference light modulated with the adjacent modulation frequency $F_1-\Delta f_1$ and passed through the third reference optical path 29 by the local oscillation signal of the frequency $F_1+\Delta f_1$.

The second frequency converter 44 generates an intermediate frequency signal of a frequency $\Delta f_2$ by multiplying a signal obtained from the distance measuring light modulated with the main modulation frequency $F_2$ and passed through the distance measuring optical path 23 by a local oscillation signal of a frequency $F_2+\Delta f_2$ close to each of the foregoing main modulation frequency $F_2$ and adjacent modulation frequency $F_2-\Delta f_2$. Moreover, the second frequency converter 44 generates an intermediate frequency signal of a frequency $2\Delta f_2$ by multiplying a signal obtained from the reference light modulated with the adjacent modulation frequency $F_2-\Delta f_2$ and passed through the third reference optical path 29 by the local oscillation signal of the frequency $F_2+\Delta f_2$.

The third frequency converter 50 generates an intermediate frequency signal of a frequency $\Delta f_1$ by multiplying a signal obtained from the reference light modulated with the main modulation frequency $F_1$ and passed through the first reference optical path 26 by the local oscillation signal of the frequency $F_1+\Delta f_1$. Moreover, the third frequency converter 50 generates an intermediate frequency signal of a frequency $2\Delta f_1$ by multiplying a signal obtained from the reference light modulated with the adjacent modulation frequency $F_1-\Delta f_1$ and passed through the second reference optical path 31 by the local oscillation signal of the frequency $F_1+\Delta f_1$.

The fourth frequency converter 52 generates an intermediate frequency signal of a frequency $\Delta f_2$ by multiplying a signal obtained from the reference light modulated with the main modulation frequency $F_2$ and passed through the first reference optical path 26 by the local oscillation signal of the frequency $F_2+\Delta f_2$. Moreover, the fourth frequency converter 52 generates an intermediate frequency signal of a frequency $2\Delta f_2$ by multiplying a signal obtained from the reference light modulated with the adjacent modulation frequency $F_2-\Delta f_2$ and passed through the second reference optical path 31 by the local oscillation signal of the frequency $F_2+\Delta f_2$.

Thus, simultaneously, a total of eight intermediate frequency signals of the intermediate frequency signals of the frequencies $\Delta f_1$ and $\Delta f_2$ according to the distance measuring optical path 23, the intermediate frequency signals of the frequencies $\Delta f_1$ and $\Delta f_2$ according to the first reference optical path 26, the intermediate frequency signals of the frequencies $2\Delta f_1$ and $2\Delta f_2$ according to the second reference optical path 31, and the intermediate frequency signals of the frequencies $2\Delta f_1$ and $2\Delta f_2$ according to the third reference optical path 29 are obtained at one time. By separating the eight intermediate frequency signals by appropriate means such as a filter or a Fourier transformer, and determining initial phases of the respective intermediate frequency signals, the distance to the target 22 is calculated with errors generated inside the electro-optical distance meter having been corrected.

This electro-optical distance meter will be described in greater detail based on the block diagram of FIG. 2.

First, a signal of the main modulation frequency $F_1$ is generated by an oscillator 1. This signal of the main modulation frequency $F_1$ is not only input to a frequency divider unit 2 but also input to oscillators 5 and 11 via PLLs 9 and 10. The PLLs 9 and 10 are used to oscillate the oscillators 5 and 11 accurately at the adjacent modulation frequency $F_1-\Delta f_1$ and the local oscillation frequency $F_1+\Delta f_1$.

The frequency divider unit 2 divides the frequency of the signal of the main modulation frequency $F_1$ to generate a signal of the main modulation frequency $F_2$. These signals of the main modulation frequencies $F_2$ and $F_1$ are input to a drive circuit 4 through a frequency superimposing circuit 3. The first light-emitting element 13 is driven by the drive circuit 4, and emits light modulated with the main modulation frequencies $F_1$ and $F_2$.

The oscillator 5 generates a signal of the adjacent modulation frequency $F_1-\Delta f_1$. This signal of the adjacent modulation frequency $F_1-\Delta f_1$ is further divided in frequency by a frequency divider unit 6 to be a signal of the adjacent modulation frequency $F_2-\Delta f_2$. The signals of the adjacent modulation frequencies $F_1-\Delta f_1$ and $F_2-\Delta f_2$ are input to a drive circuit 8 through a frequency superimposing circuit 7. The second light-emitting element 14 is driven by the drive circuit 8, and emits light modulated with the adjacent modulation frequencies $F_1-\Delta f_1$ and $F_2-\Delta f_2$.

The oscillator 11 generates a local oscillation signal of a frequency $F_1+\Delta f_1$. From this local signal of the frequency $F_1+\Delta f_1$, a local oscillation signal of the frequency $F_2+\Delta f_2$ is also generated by a frequency generating circuit 12. These local oscillation signals of the frequencies $F_1+\Delta f_1$ and $F_2+\Delta f_2$ are, as to be described later, input to the frequency converters 42, 44, 50, and 52.

Light emitted from the first light-emitting element 13 is split into two parts by a beam splitter 20, one of these is emitted as a distance measuring light from a light transmission optical system (not shown), and made incident onto the first light receiving element 40 through the distance measuring optical path 23 for traveling to and from the target reflection object 22, and the other is as a reference light made incident onto the second light receiving element 48 through the first reference optical path 26. In the distance measuring optical path 23, a light amount adjusting neutral density filter 24 and light receiving optical system 25 are disposed in front of the light receiving element 40. Also in the first reference optical path 26, a light amount adjusting neutral density filter 27 is disposed in front of the light receiving element 48.

Light emitted from the second light-emitting element 14 is split into two parts by a beam splitter 28, one of these is as a reference light made incident onto the second light receiving element 48 through the second reference optical path 31, and the other is as a reference light made incident onto the first light receiving element 40 through the third reference optical path 29. Also in the second reference optical path 31, a light amount adjusting neutral density filter 32 is disposed in front of the light receiving element 48, and also in the third reference optical path 29, a light amount adjusting neutral density filter 30 is disposed in front of the light receiving element 40.

The output of the first light receiving element 40 is split into two parts through an amplifier 41, one of these is input to the first frequency converter 42, and the other is input to the second frequency converter 44. The output of the second light receiving element 48 is also split into two parts through an amplifier 49, one of these is input to the third frequency converter 50, and the other is input to the fourth frequency converter 52.

As has been described in the foregoing, a total of eight intermediate frequency signals are obtained from the first to fourth respective frequency converters 42, 44, 50, and 52. From the intermediate frequency signals output from the respective frequency converters 42, 44, 50, and 52, high-frequency components are removed by low-pass filters 43, 45, 51, and 53, respectively.

The outputs of the low-pass filter 43 and the low-pass filter 45 are input to an A/D converter 47 after being added by an adder 46. That is, to the A/D converter 47, two intermediate frequency signals of the frequencies $\Delta f_1$ and $\Delta f_2$ according to the distance measuring optical path 23 and two intermediate frequency signals of the frequencies $2\Delta f_1$ and $2\Delta f_2$ according to the third reference optical path 29 are input. These intermediate frequency signals are separated by a digital band-pass filter (not shown) after A/D conversion, and further, the initial phases and amplitudes of the respective intermediate frequency signals are obtained.

The outputs of the low-pass filter 51 and the low-pass filter 53 are input to an A/D converter 55 after being added by an adder 54. That is, to the A/D converter 55, two intermediate frequency signals of the frequencies $\Delta f_1$ and $\Delta f_2$ according to the first reference optical path 26 and two intermediate frequency signals of the frequencies $2\Delta f_1$ and $2\Delta f_2$ according to the second reference optical path 31 are input. These intermediate frequency signals are separated by a digital band-pass filter (not shown) after A/D conversion, and further, the initial phases and amplitudes of the respective intermediate frequency signals are obtained.

When the initial phases of the eight intermediate frequency signals are determined, the distance to the target reflection object 22 is calculated with errors generated inside the electro-optical distance meter having been corrected. Moreover, when the amplitudes of the respective intermediate frequency signals are also determined, these amplitudes are used for a light amount adjustment by the respective neutral density filters 24, 27, 30, and 32.

Meanwhile, with regard to the intermediate frequency signals, integral multiples of the frequency $\Delta f_2$ are provided as the frequencies $2\Delta f_2$, $\Delta f_1$, and $2\Delta f_1$. Accordingly, the four frequencies can be separated reliably by the digital band-pass filter. Moreover, the respective intermediate frequency signals are, when being input to the A/D converter 47 or 55, reduced to a signal level that is ¼ of that with only one signal. This is for preventing, when the four signals are synthesized, the input level from being saturated. As a matter of course, unless the input level to the A/D converter 47 or 55 is saturated, the respective intermediate frequency signal levels may be set to a signal level that is ¼ or more of that with only one signal.

According to the present embodiment, because the initial phases of the respective intermediate frequency signals according to the distance measuring optical path and reference light paths are simultaneously determined without using a shutter for switching between the distance measuring light and reference light and also without switching frequencies, a distance measurement can be performed more speedily than conventionally performed. Moreover, a cost reduction by omitting a shutter is enabled. Further, conventionally, light-emitting elements under a continuous distance measurement had been kept powered on in order to reduce the temperature phase drift. However, according to the present invention, because a simultaneous distance measurement for the distance measuring optical path and reference optical paths is enabled, the temperature phase drift cancels out, and thus the power of the light-emitting elements can be turned on and off at each measurement, so that power saving can be realized.

Here, the reason that the temperature phase drift cancels out will be described. The temperature phase drift occurs at both of the frequencies $F_1$ and $F_2$, but because this is for the same reason, description will be given here in terms of the frequency $F_1$. The frequency of an electrical signal that is applied to the first light-emitting element 13 is provided as $F_1=(1+0)F_1$, the frequency of an electrical signal that is applied to the second light-emitting element 14 is provided as $F_1-\Delta f_1=(1+b)F_1$, the local oscillation frequency that is applied to the frequency converters 42 and 50 connected to the light receiving elements 40 and 48 is provided as $F_{lo}=(1+a)F_1$, and consideration is given with a condition of a>0>b.

The waveform $y_1$ of an output of the light receiving element 40 is as follows.

$$y_1 = y_{pd1,ld1} \cos\{2\pi F_1 t + \psi_{ld1}(F_1) + \psi_{pd1}(F_1) - 2\pi F_1(2D_0/c)\} + y_{pd1,ld2} \cos\{2\pi(1+b)F_1 t + \psi_{ld2}((1+b)F_1) + \psi_{pd1}((1+b)F_1) - 2\pi(1+b)F_1(2D_3/c)\} \quad (1)$$

The waveform $y_2$ of an output of the light receiving element 48 is as follows.

$$y_2 = y_{pd2,ld1} \cos\{2\pi F_1 t + \psi_{ld1}(F_1) + \psi_{pd2}(F_1) - 2\pi F_1(2D_1/c)\} + y_{pd2,ld2} \cos\{2\pi(1+b)F_1 t + \psi_{ld2}((1+b)F_1) + \psi_{pd2}((1+b)F_1) - 2\pi(1+b)F_1(2D_2/c)\} \quad (2)$$

However, the respective symbols are defined as follows.

$y_{pd1,ld1}$: Amplitude of signal between first light-emitting element 13 and first light receiving element 40

$y_{pd1,ld2}$: Amplitude of signal between second light-emitting element 14 and first light receiving element 40

$y_{pd2,ld1}$: Amplitude of signal between first light-emitting element 13 and second light receiving element 48

$y_{pd2,ld2}$: Amplitude of signal between second light-emitting element 14 and second light receiving element 48

$\psi_{ld1}$: Temperature phase drift of first light-emitting element 13

$\psi_{ld2}$: Temperature phase drift of second light-emitting element 14

$\psi_{ld1}$: Temperature phase drift of first light receiving element 40

$\psi_{pd2}$: Temperature phase drift of second light receiving element 48

$2D_0$: Distance to and from electro-optical distance meter to target reflection object $2D_1$: Optical path length of first reference optical path 26

$2D_2$: Optical path length of second reference optical path 31

$2D_3$: Optical path length of third reference optical path 29 c: Speed of light

Next, the waveform $y_3$ of local oscillation signals that are input to the frequency converters 42 and 50 is, where the amplitude of the local oscillation signal is provided as $y_{lo}$, and the initial phase of the local oscillation signal is provided as $\phi$, as follows.

$$y_3 = y_{lo} \cos\{2\pi(1+a)F_1 t + \phi\} \quad (3)$$

The output waveforms $y_4$ and $y_5$ from the low-pass filters 43 and 51 connected to the frequency converters 42 and 50 are, by adding temperature phase drifts $\psi_{f1}$ and $\psi_{f2}$ of the low-pass filters 43 and 51 to $y_1 \times y_3$ and $y_2 \times y_3$, respectively, as follows.

$$y_4 = (y_{pd1,ld1} y_{lo}/2)\cos\{2\pi aF_1 t - \psi_{ld1}(F_1) - \psi_{pd1}(F_1) + \psi_{f1}(aF_1) + 2\pi F_1(2D_0/c) + \phi\} + (y_{pd1,ld2} y_{lo}/2)\cos\{2\pi(a-b)F_1 t - \psi_{ld2}((1+b)F_1) - \psi_{pd1}((1+b)F_1) + \psi_{f1}((a-b)F_1) + 2\pi(1+b)F_1(2D_2/c) + \phi\} \quad (4)$$

$$y_5 = (y_{pd2,ld1} y_{lo}/2)\cos\{2\pi aF_1 t - \psi_{ld1}(F_1) - \psi_{pd2}(F_1) + \psi_{f2}(aF_1) + 2\pi F_1(2D_1/c) + \phi\} + (y_{pd2,ld2} y_{lo}/2)\cos\{2\pi(a-b)F_1 t - \psi_{ld2}((1+b)F_1) - \psi_{pd2}((1+b)F_1) + \psi_{f2}((a-b)F_1) + 2\pi(1+b)F_1(2D_2/c) + \phi\} \quad (5)$$

Because a measurement value d is, where the initial phase of an intermediate frequency signal is provided as $\theta$, determined to be $d = \theta c/(2\pi F)$, where a measurement value to be determined from a phase component of the first term of $y_4$ according to the distance measuring optical path 23 is provided as $d_0$, a measurement value to be determined from a phase component of the second term of $y_4$ according to the third reference optical path 29 is provided as $d_3$, a measurement value to be determined from a phase component of the first term of $y_5$ according to the first reference optical path 26 is provided as $d_1$, and a measurement value to be determined from a phase component of the second term of $y_5$ according to the second reference optical path 31 is provided as $d_2$, then $d_0$, $d_3$, $d_1$, and $d_2$ are respectively determined as follows. However, this is provided that F1=75 MHz.

$$d_0 = 2D_0 + \{4/(2\pi)\}\{-\psi_{ld1}(F_1) - \psi_{pd1}(F_1) + \psi_{f1}(aF_1) + \phi\}$$

$$d_3 = 2D_3 + \{4/(2\pi(1+b))\}\{-\psi_{ld2}((1+b)F_1) - \psi_{pd1}(1+b)F_1) + \psi_{f1}((a-b)F_1) + \phi\}$$

$$d_1 = 2D_1 + \{4/(2\pi)\}\{-\psi_{ld1}(F_1) - \psi_{pd2}(F_1) + \psi_{f2}(aF_1) + \phi\}$$

$$d_2 = 2D_2 + \{4/(2\pi(1+b))\}\{-\psi_{ld2}((1+b)F_1) - \psi_{pd2}((1+b)F_1) + \psi_{f2}((a-b)F_1) + \phi\} \quad (6)$$

The measurement values $d_0$, $d_3$, $d_1$, and $d_2$ are added and subtracted as follows.

$$(d_0 - d_3) - (d_1 - d_2) = d_0 - d_1 + d_2 - d_3 = 2D_0 - 2D_1 + 2D_2 - 2D_3 + \{4/(2\pi)\}\{\psi_{pd2}(F_1) - \psi_{pd1}(F_1) - \psi_{f2}(aF_1) + \psi_{f1}(aF_1)\} - \{4/(2\pi(1+b))\}\{\psi_{pd2}((1+b)F_1) - \psi_{pd1}((1+b)F_1) - \psi_{f2}((a-b)F_1) + \psi_{f1}((a-b)F_1)\} \quad (7)$$

Here, because the respective frequencies $F_1$, $F_1 - \Delta f_1$, and $F_{lo}$ are close to each other, the following approximation is performed.

$$\{4/(2\pi)\}\{\psi_{Pd2}(F_1)\} \approx \{4/(2\pi(1+b))\}\{\psi_{Pd2}((1+b)F_1)\} \quad (8)$$

$$\{4/(2\pi)\}\{-\psi_{Pd1}(F_1)\} \approx \{4/(2\pi(1+b))\}\{-\psi_{Pd1}((1+b)F_1)\} \quad (9)$$

Then, formula (7) can be expressed as in the following formula.

$$(d_0 - d_3) - (d_1 - d_2) \approx 2D_0 - 2D_1 + 2D_2 - 2D_3 + [\{4/(2\pi)\}\{\psi_{f1}(aF_1)\} - \{4/(2\pi(1+b))\}\{\psi_{f1}((a-b)F_1)\}] - [\{4/(2\pi)\}\{\psi_{f2}(aF_1)\} - \{4/(2\pi(1+b))\}\{\psi_{f2}((a-b)F_1)\}] \quad (10)$$

It can be understood from formula (10) that not only do the temperature phase drifts $\psi_{ld1}$ and $\psi_{ld2}$ of the light-emitting elements 13 and 14 and the temperature phase drifts $\psi_{Pd1}$ and $\psi_{Pd2}$ of the light receiving elements 40 and 48 no longer exist, but in each of the second line and the third line of formula (10), the former and latter terms also cancel out, and further, because the second line and the third line of formula (10) also cancel out, the temperature phase drifts $\psi_{f1}$ and $\psi_{f2}$ of the low-pass filters 43 and 51 have also been reduced.

Moreover, it can also be understood that, for providing an effect to reduce temperature phase drifts of the low-pass filters 43 and 51, even conditions of a>b>0, b>0>a, and 0>b>a suffice, in addition to a>0>b. Examples of frequencies to provide such conditions are shown in FIG. 3. However, in the cases of b>a>0 and 0>a>b, the effect to reduce temperature phase drifts is small.

Here, the principle of the digital band-pass filter of the present embodiment will also be simply described. Its periodic function y can be expressed, when its constant term is omitted, by a Fourier series as in the following formula.

$$y = a_1 \sin \omega t + a_2 \sin 2\omega t + a_3 \sin 3\omega t + \ldots + a_n \sin(n\omega t) + \ldots + b_1 \cos \omega t + b_2 \cos 2\omega t + b_3 \cos 3\omega t + \ldots b_n \cos(n\omega t) + \quad (11)$$

Provided that, $a_n = (1/\pi)\int_0^{2\pi} y \sin(n\omega t) dt \quad (12)$ $$b_n = (1/\pi)\int_0^{2\pi} y \cos(n\omega t) dt \quad (13)$$

From the above formula (12) and formula (13), $a_1$ is determined by integrating the periodic function y having been multiplied by a sine wave having the same period as that of a fundamental wave (one of the lowest frequency) $a_1 \sin \omega t + b_1 \cos \omega t$ over one period of the fundamental wave, and $a_n$ is determined by integrating the periodic function y having been multiplied by a sine wave being an n-th harmonic wave of the fundamental wave over one period of the fundamental wave. Moreover, $b_1$ is determined by integrating the periodic function y having been multiplied by a cosine wave having the same period as that of the fundamental wave $a_1 \sin \omega t + b_1 \cos \omega t$ over one period of the fundamental wave, and $b_n$ is determined by integrating the periodic function y having been multiplied by a cosine wave being an n-th harmonic wave of the fundamental wave over one period of the fundamental wave. Accordingly, the amplitude An and the initial phase $\phi n$ of an n-th harmonic wave (which is a fundamental wave when n=1) are determined from the following formulae.

$$An = \sqrt{(a_n^2 + b_n^2)} \quad (14)$$

$$\phi n = \tan^{-1}(b_n/a_n) \quad (15)$$

In the above-described embodiment, of the frequencies of the respective intermediate frequency signals, the lowest one is $\Delta f_2$, and the others are $2\Delta f_2$, $\Delta f_1$, and $2\Delta f_1$, integral multiples of the frequency $\Delta f_2$. Therefore, a total intermediate frequency signal for which four intermediate frequency signals are added becomes a periodic function y having a fundamental wave $a_1 \sin \omega t + b_1 \cos \omega t$ of the frequency $\Delta f_2$, and can be expressed by the above formulae (11) to (13).

So, $a_1$ is determined by summing the total intermediate frequency signal y for which four intermediate frequency signals were added having been sampled an appropriate number of times (for example, 320 times) for one period of the fundamental wave and multiplied by a sine wave having the same period as that of the fundamental wave. $b_1$ is determined by summing the total intermediate frequency signal y having been sampled an appropriate number of times for one period of the fundamental wave and multiplied by a cosine wave having the same period as that of the fundamental wave. Accordingly, by using formulae (14) and (15), the amplitude $A_1$ and the initial phase $\phi_1$ of the intermediate frequency signal of the frequency $\Delta f_2$ are determined.

Next, $a_2$ is determined by summing the total intermediate frequency signal y having been sampled an appropriate number of times for one period of the fundamental wave and multiplied by a sine wave being a second harmonic wave of the fundamental wave. $b_2$ is determined by summing the total intermediate frequency signal y having been sampled an appropriate number of times for one period of the fundamental wave and multiplied by a cosine wave being a second harmonic wave of the fundamental wave. Accordingly, by using formulae (14) and (15), the amplitude $A_2$ and the initial phase $\phi_2$ of the intermediate frequency signal having a frequency $2\Delta f_2$ and that is a second harmonic wave are determined.

Similarly, in the following, $a_n$ is determined by summing the total intermediate frequency signal y having been sampled an appropriate number of times for one period of the fundamental wave and multiplied by a sine wave being an n-th harmonic wave of the fundamental wave. $b_n$ is determined by summing the total intermediate frequency signal y having been sampled an appropriate number of times for one period of the fundamental wave and multiplied by a cosine wave being an n-th harmonic wave of the fundamental wave. Accordingly, by using formulae (14) and (15), the amplitude $A_n$ and the initial phase $\phi_n$ of an intermediate frequency signal that is an n-th harmonic wave are determined. If the respective intermediate frequency signals have a frequency ratio of 1:2:20:40, for example, also for the intermediate frequency signal of the frequencies $\Delta f_1$ and $2\Delta f_1$, their respective amplitudes $A_{20}$ and $A_{40}$ and their respective initial phases $\phi_{20}$ and $\phi_{40}$ can be obtained. In addition, with this frequency ratio, it is not necessary to calculate the amplitudes and initial phases other than $A_1$, $A_2$, $A_{20}$, and $A_{40}$ and $\phi_1$, $\phi_2$, $\phi_{20}$, and $\phi_{40}$.

Figure 4:
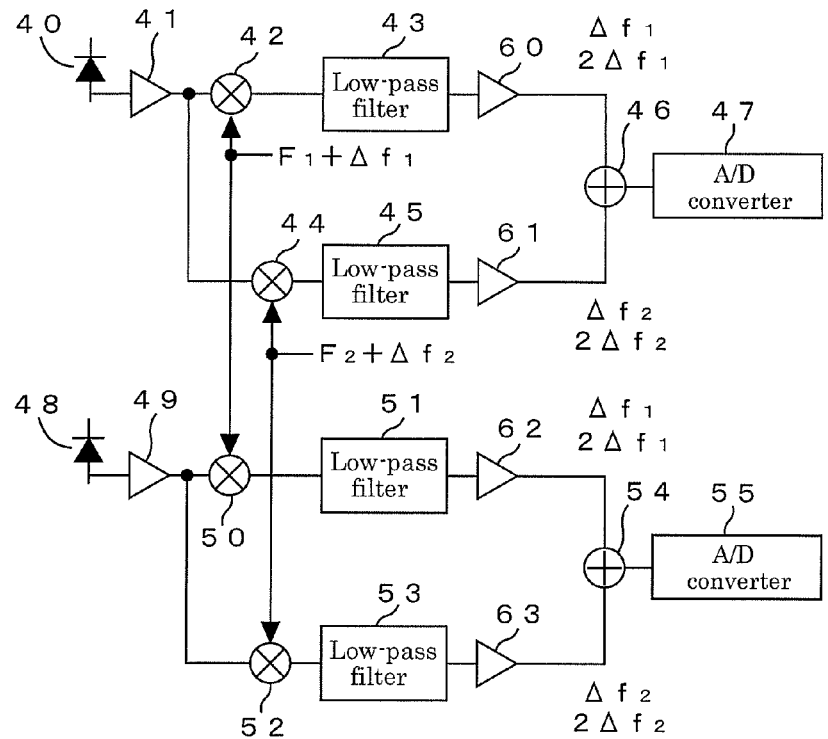
FIG. 4 is a block diagram of an electro-optical distance meter according to a second embodiment of the present invention.
Figure 5:
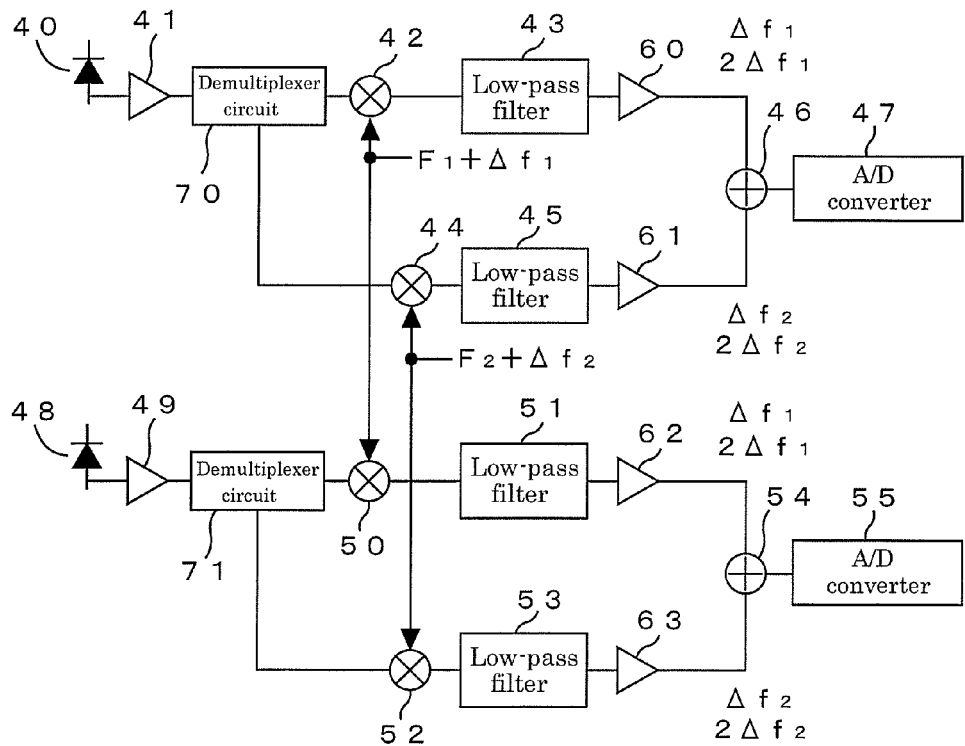
FIG. 5 is a block diagram of an electro-optical distance meter according to a third embodiment of the present invention.

However, the present invention is not limited to the above-described embodiment, and various modifications can be made. For example, as shown in FIG. 4, amplifiers 60, 61, 62, and 63 may be disposed behind the low-pass filters 43, 45, 51, and 53, respectively, to adjust the level of signals to be input to the adders 46 and 54. Moreover, as shown in FIG. 5, demultiplexer circuits 70 and 71 may be disposed behind the amplifiers 41 and 49 so that only appropriate signals are input to each of the frequency converters 42, 44, 50, and 52.

Figure 6:
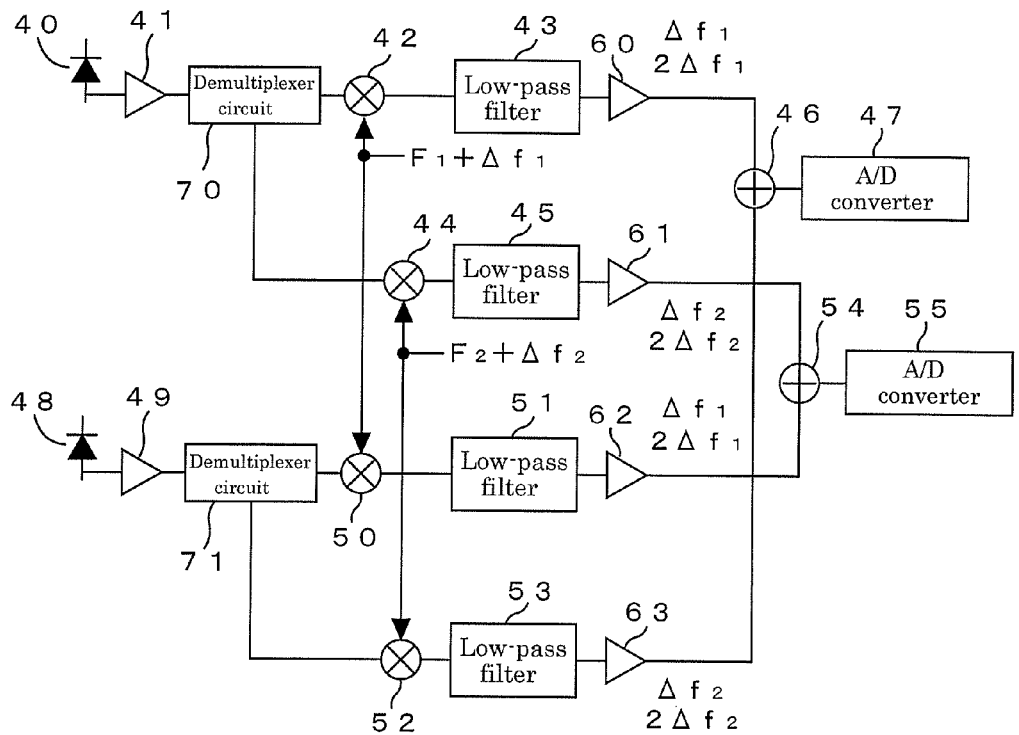
FIG. 6 is a block diagram of an electro-optical distance meter according to a fourth embodiment of the present invention.

Further, as shown in FIG. 6, there may be an alteration so that the output of an amplifier 61 following the low-pass filter 45 is input to the adder 54, and the output of an amplifier 63 following the low-pass filter 53 is input to the adder 46. In this case, three intermediate frequency signals of high signal levels according to reference optical paths and an intermediate frequency signal of a low signal level according to a distance measuring optical path are input to both of the A/D converters 47 and 55. Then, as compared with the case where four intermediate frequency signals according to reference optical paths are input to the A/D converter 55 and two intermediate frequency signals according to a reference optical path and two intermediate frequency signals according to a distance measuring optical path are input to the A/D converter 47 as in the embodiment shown in FIG. 2 to FIG. 5, the amplification of amplifiers 62 and 63 can be reduced to make input signals to the A/D converter 47 unlikely to saturate. Because the amplification of amplifiers 60 and 61 can be conversely increased, a longer-distance measurement is enabled.

Figure 7:
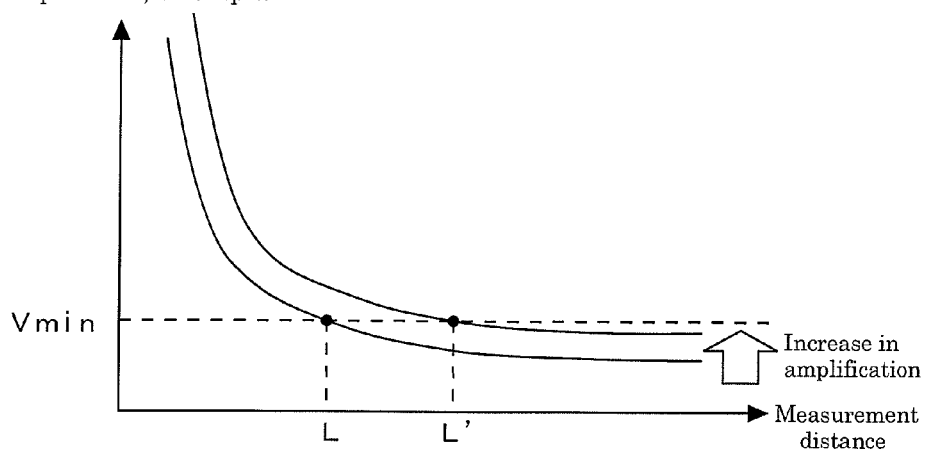
FIG. 7 is a view for explaining the reason that a long-distance measurement is enabled by the electro-optical distance meter according to the above-described fourth embodiment.

The reason that an increase in amplification of the amplifiers 60 and 61 enables a long-distance measurement will be described based on FIG. 7. FIG. 7 shows a relationship between the measurement distance and output of the amplifiers 60 and 61. Because the light receiving amount of the light receiving elements 40 and 48 is reduced at a longer distance, the output of the amplifiers 60 and 61 slopes downward to the right. With a small amplification, the output reaches the minimum level Vim or more necessary for an input to the A/D converters 47 and 55 when it is at a distance shorter than the distance L. With an increased amplification of the amplifier 60 and 61, even at the distance L' of a longer distance, because the output of the amplifiers 60 and 61 can be amplified to the minimum level Vim or more necessary for an input to the A/D converters 47 and 55, a longer-distance measurement is enabled.

Figure 8:
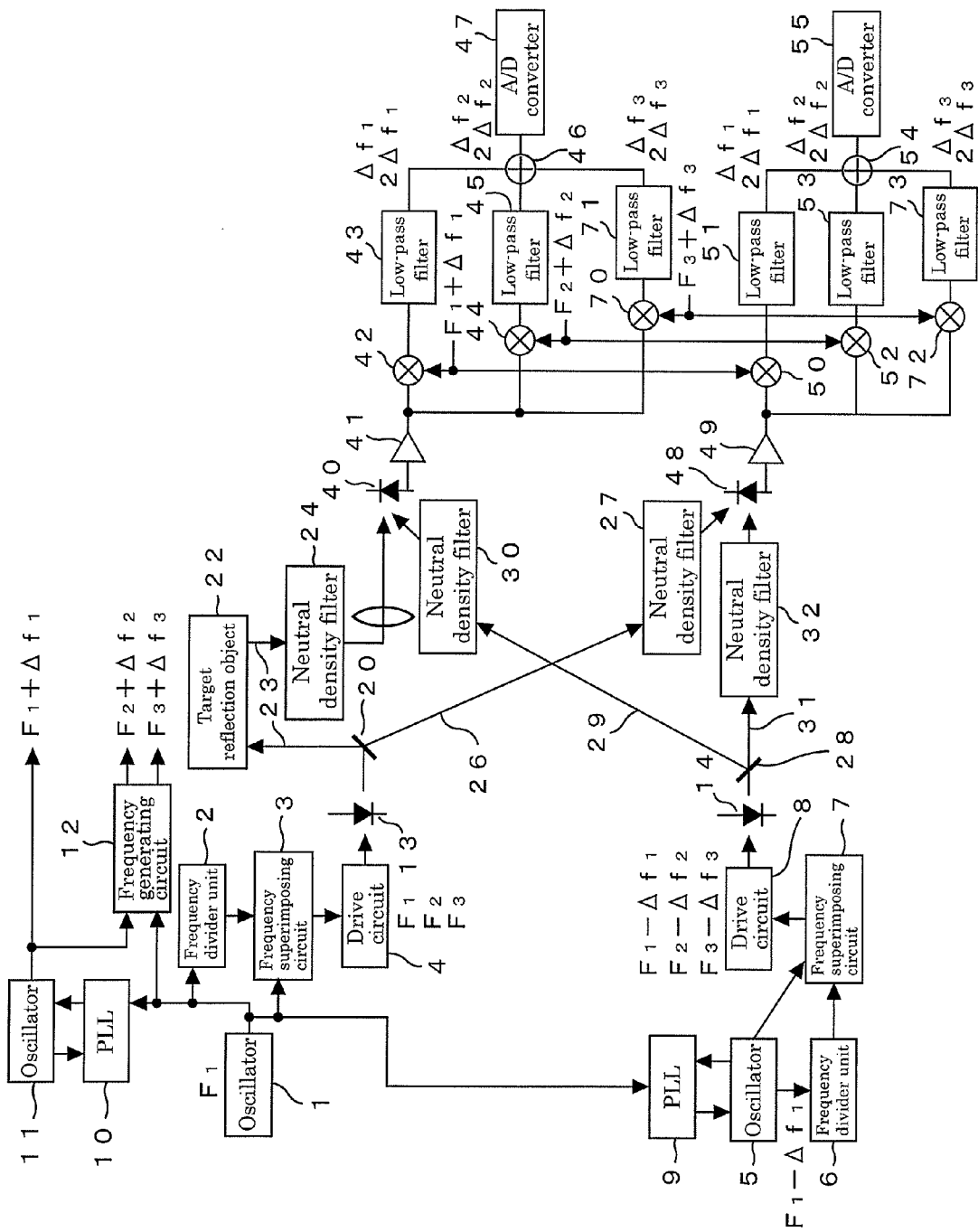
FIG. 8 is a block diagram of an electro-optical distance meter according to a fifth embodiment of the present invention.
Figure 9:
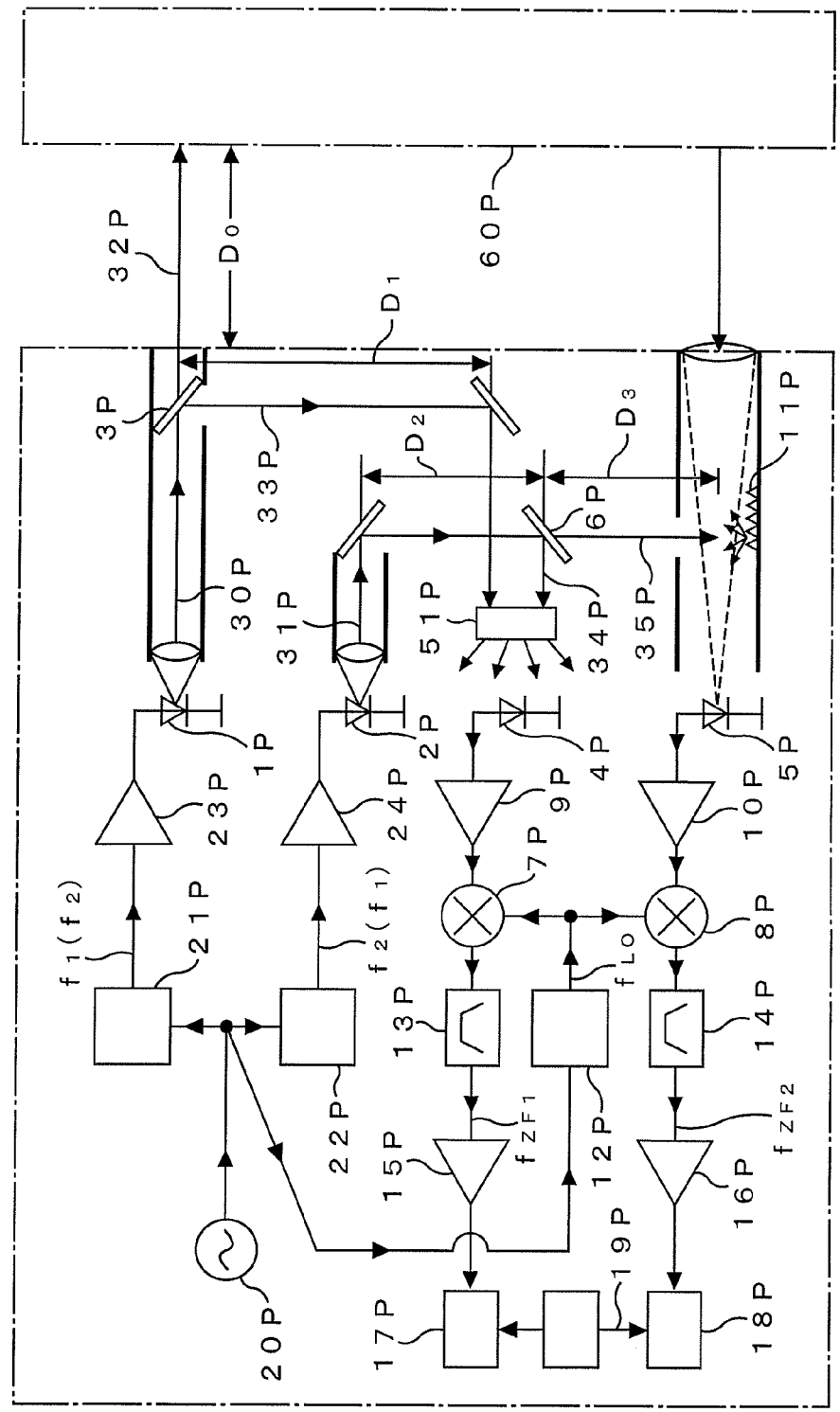
FIG. 9 is a block diagram of a conventional electro-optical distance meter.

Further, as shown in FIG. 8, a frequency $F_3$ may be added to the main modulation frequencies that are generated by the frequency divider unit 2 and a frequency $F_3-\Delta f_3$ may be added to the adjacent modulation frequencies that are generated by the frequency divider unit 6 to modulate each of both light-emitting elements 13 and 14 by three frequencies, and two frequency converters 70 and 72 and two low-pass filters 71 and 73 may be added and a local oscillation signal of a frequency $F_3+\Delta f_3$ may be input to each of both frequency converters 70 and 72 to obtain intermediate frequency signals of frequencies $\Delta f_3$ and $2\Delta f_3$ from each of both frequency low-pass filters 71 and 73, so that 12 intermediate frequency signals can be obtained altogether. Thus, the more modulation frequencies are increased, the more the measurement range is increased, and thus the measurement range can be made wider.

In this case, when the frequencies $\Delta f_3$ and $2\Delta f_3$ of the intermediate frequency signals are excessively low and handling thereof by amplifiers, filters, and the like is difficult, the local oscillation frequency may be changed to $F_3+\delta f_3+\Delta f_3$ so as to generate intermediate frequency signals of frequencies $\delta f_3+\Delta f_3$ and $\delta f_3+2\Delta f_3$. However, it is necessary to provide the frequencies of all intermediate frequency signals as integral multiples of the lowest frequency $\delta f_3+\Delta f_3$ so that the respective intermediate frequency signals can be reliably separated by a digital band-pass filter.

Further, the present invention is not limited to the above-described embodiments, and for example, the present invention can be widely used not only for an electro-optical distance meter, but also for a surveying instrument with a built-in electro-optical distance meter, for example, a total station, and other distance measuring devices etc.

REFERENCE SIGNS LIST 13, 14 Light-emitting element
22 Target reflection object
23 Distance measuring optical path
26, 29, 31 Reference optical channel
40, 48 Light receiving element
44, 50, 52 Frequency converter
$F_1$, $F_2$, $F_3$ Main modulation frequency
$F_1-\Delta f_1$, $F_2-\Delta f_2$, $F_3-\Delta f_3$ Adjacent modulation frequency
$F_1+\Delta f_1$, $F_2+\Delta f_2$, $F_3+\Delta f_3$ Local oscillation frequency
The invention claimed is:

1. An electro-optical distance meter including a first light-emitting element which emits light simultaneously modulated with a plurality of main modulation frequencies, a second light-emitting element which emits light simultaneously modulated with a plurality of adjacent modulation frequencies different from the main modulation frequencies, respectively, a first light receiving element and a second light receiving element which receive light emitted from both light-emitting elements, a first frequency converter group connected to the first light receiving element, and a second frequency converter group connected to the second light receiving element, wherein the light emitted from the first light-emitting element is split into two parts, one of these is as a distance measuring light made incident onto the first light receiving element through a distance measuring optical path for traveling to and from a target reflection object, and the other is as a reference light made incident onto the second light receiving element through a first reference optical path, and the light emitted from the second light-emitting element is split into two parts, one of these is as a reference light made incident onto the second light receiving element through a second reference optical path, and the other is as a reference light made incident onto the first light receiving element through a third reference optical path, the first frequency converter group and the second frequency converter group are each composed of frequency converters which are the same in number as the main modulation frequencies, the respective frequency converters are input with local oscillation signals of frequencies different from each other, and the frequencies of said local oscillation signals are provided, respectively, as frequencies different from both of the respective main modulation frequencies and the respective adjacent modulation frequencies different from the respective main modulation frequencies, and a distance to the target reference object is calculated by using intermediate frequency signals generated in the respective frequency converters.

2. The electro-optical distance meter according to claim 1, wherein the respective intermediate frequency signals have frequencies which are integral multiples of the lowest frequency, and the respective intermediate frequency signals are separated by a digital band-pass filter.

* * * * *